United States Patent
Ohnishi et al.

(10) Patent No.: US 6,241,051 B1
(45) Date of Patent: Jun. 5, 2001

(54) BRAKE CABLE CONNECTING DEVICE FOR DRUM BRAKE

(75) Inventors: Junichi Ohnishi, Nagoya; Seiji Asai, Okazaki, both of (JP)

(73) Assignee: Nisshimbo Industries, Inc., Tokyo (JP)

( * ) Notice: Subject to any disclaimer, the term of this patent is extended or adjusted under 35 U.S.C. 154(b) by 0 days.

(21) Appl. No.: 09/616,290

(22) Filed: Jul. 14, 2000

(30) Foreign Application Priority Data

Mar. 8, 2000 (JP) .................................................. 12-063209

(51) Int. Cl.[7] ........................................................ B60T 1/00
(52) U.S. Cl. ........................................ 188/2 D; 188/106 A
(58) Field of Search ................................ 188/2 D, 106 A, 188/106 F, 106 P, 325; 74/502.6

(56) References Cited

U.S. PATENT DOCUMENTS

| | | | | |
|---|---|---|---|---|
| B1 3,064,767 | * | 11/1962 | Wieger .................................... | 188/78 |
| B1 4,232,765 | * | 11/1980 | Rupprecht ............................... | 188/78 |
| B1 4,595,084 | * | 6/1986 | Le Deit ................................... | 188/328 |
| B1 4,753,325 | * | 6/1988 | Jaksic ..................................... | 188/2 D |
| B1 4,872,533 | * | 10/1989 | Boyer et al. ........................... | 188/2 D |
| B1 4,886,146 | * | 12/1989 | Copp ...................................... | 188/2 D |
| B1 4,930,605 | * | 6/1990 | Boyer et al. ........................... | 188/2 D |
| B1 4,974,708 | * | 12/1990 | Maligne ................................. | 188/328 |
| B1 5,137,120 | * | 8/1992 | Barbosa ................................. | 188/2 D |
| B1 5,142,935 | * | 9/1992 | Carr ....................................... | 74/502.6 |
| B1 5,377,789 | * | 1/1995 | Brooks, Sr. et al. .................. | 188/20 |
| B1 5,477,746 | * | 12/1995 | Perisho et al. ........................ | 74/512 |
| B1 6,105,732 | * | 8/2000 | Venetos ................................. | 188/20 |

* cited by examiner

Primary Examiner—Robert J. Oberleitner
Assistant Examiner—Benjamin A. Pezzlo
(74) Attorney, Agent, or Firm—Muramatsu & Associates

(57) ABSTRACT

A brake cable connecting device for fastening a brake cable to a brake lever in a blind manner reduces cost and weight of the brake device. The connecting device is formed of a U-shaped channel provided on a free end of the brake lever and a guide unit for automatically attaching the brake cable to the free end of the brake lever when the brake cable is pushed toward the brake lever. The guide unit made separately from the brake lever includes a cable retaining groove bent into U-shape and mounted in the channel of the brake lever, a guide member for guiding the brake cable toward the free end of the brake lever, and a ramped surface for deflecting the brake cable when the brake cable moves along the surface thereof for generating a return force in the brake cable. The brake cable snaps in the cable retaining groove by the return force when an end thereof passes the peak of the ramped surface.

9 Claims, 6 Drawing Sheets

BRAKE CABLE CONNECTING DEVICE FOR DRUM BRAKE

FIELD OF THE INVENTION

This invention relates to a drum brake device activated by a brake cable such as a parking brake, and more particularly, to a brake cable connecting device for connecting the brake cable to a brake lever within the drum brake in a blind manner.

BACKGROUND OF THE INVENTION

As a brake cable connecting device for a drum brake, a forward-pull type parking brake device is known wherein a brake cable is connected to a free end of a brake lever in the drum brake while a base end of the brake lever is pivotally mounted on a shoe web of one of the brake shoes.

The brake cable that activates the brake lever by being pulled from a distance is comprised mainly of an inner cable and an outer casing. At the free end of the brake lever, there is provided with a cable retaining groove bent into U-shape in cross section. One end of the inner cable is connected to a brake application device such as a hand lever in a driver's compartment, and the other end of the inner cable is inserted into the drum brake through an opening in a back plate and is fit in the cable retaining groove of the brake lever.

When an enlarged cable end fixed to the other end of the inner cable engages on an edge surface of the cable retaining groove opposite to a cable pulling direction, the brake cable is completely installed in the cable retaining groove. When the hand lever is operated in the driver's compartment, the inner cable is pulled accordingly, which rotates the brake lever to open a pair of brake shoes to activate the parking brake.

In a brake device of this kind, when the brake cable is pre-installed, several disadvantages are incurred such as a problem of maintaining associated parts, increase in space required for transportation, and/or damages in the brake cable or other components. Thus, it is desirable not to install the brake cable in the assembly process of the brake device, but to do it during the assembly process of the automobile.

However, in general, the brake lever in the drum brake is arranged under the shoe web of the brake shoe, i.e., the back plate side of the shoe web, which makes it difficult to engage the cable end with the brake lever. After the drum brake is covered with the brake drum, it becomes further difficult to specify the location of the brake device to install the brake cable.

Therefore, the connecting device for easily fastening the brake cable to the brake lever is proposed in the U.S. Pat. No. 5,002,159. In this patent, a guide pipe having a curved shape is fixed to an opening of the back plate where also an outer casing of the brake cable is connected so that the cable end passing through the guide pipe is aligned in the cable retaining groove of the brake lever.

However, in the brake cable connecting device disclosed in this patent, in order to align the cable end accurately in the cable retaining groove of the brake lever, the guide pipe must be extended to be close enough to the cable retaining groove. When the space between the end of the guide pipe and the cable retaining groove is decreased, it causes a problem that the brake lever interferes with the guide pipe during its operation. Therefore, it is difficult to compromise both requirements described above.

The assignee of this invention proposed an improved version of the brake cable connecting device which is disclosed in the Japanese Patent Laid Open Publication No. 10-220506. This conventional device is reproduced in FIGS. 8 and 9 and described below.

FIG. 8 is a plan view showing a leading-trailing type (hereinafter "LT type") drum brake and FIG. 9 is a perspective view showing an essential portion of the brake cable connecting portion of FIG. 8. As shown in FIG. 8, brake shoes 1 and 2 arranged symmetrically at right and left in the brake device have a structure identical to each other and comprise crescent-shaped shoe webs 1a and 2a and shoe rims 1b and 2b connected respectively in T-shape in cross section. Brake linings 1c and 2c are respectively adhered to the outer surfaces of the shoe rims 1b and 2b.

The brake shoes 1 and 2 are elastically supported on a back plate 5 by shoe hold means 3 and 4. The lower adjacent ends of the brake shoes 1 and 2 are abutted against an anchor member and are limited to be lifted from the back plate 5 by a retaining plate 6. Further, the upper adjacent ends of the brake shoes 1 and 2 are respectively engaged with corresponding pistons of a wheel cylinder 7.

Between the brake shoes 1 and 2, an upper shoe return spring 8 and a lower shoe return spring 9 are respectively provided so as to urge the pair of brake shoes 1 and 2 toward each other. Between the brake shoe 1 and a brake lever 10 is provided with an adjuster 13 to be able to adjust the clearance between the brake drum (not shown) and the brake shoes 1 and 2.

The brake lever 10 is superposed under the shoe web 2a of the brake shoe 2. A base end of the brake lever 10 is rotatably supported on the shoe web 2a with a pin 11 as the fulcrum. A lever return spring 12 arranged between the shoe web 2a and the brake lever 10 applies a rotational force to the brake lever 10 with a pivotal point of the pin 11 in a clockwise direction (non-operational position).

FIG. 9 shows the structure in the vicinity of the free end of the brake lever 10 as viewed from the back plate 5 side. A cable retaining groove 10b, a guide member 10c, and a projection 10e are integrally formed on the free end portion of the brake lever 10. The cable retaining groove 10b has a U-shape for retaining an inner cable 14 that constitutes a brake cable. The guide member 10c is projected toward the cable pulling direction (hereafter "front", "front side" or "forward") from the body side of the cable retaining groove 10b. The projection 10e is formed on a turn-up portion 10d of the cable retaining groove 10b and projected toward the direction opposite to the cable pulling direction (hereafter "back", "backside" or "backward").

The guide member 10c of the brake lever 10, constituting a cable guide means, is formed in a fan-like shape which is widened toward the tip thereof and has a surface of partially conical or pyramidal. When a cable end 14a contacts anywhere on the surface of the widened end of the guide member 10c, it can be securely guided to the engagement position along the partially conical or pyramidal surface. A ramped surface 10f rising backwardly upwardly is formed on the marginal edge of the turn-up portion 10d for bending the inner cable 14 into contact with the cable end 14a upon advancing the cable end 14a thereon.

The connecting procedure of the brake cable is explained in the following. When the inner cable 14 passes through a guide pipe 16 which acts as a cable deflection means from outside (brake outside) of the back plate 5, the cable end 14a is guided toward the guide member 10c of the brake lever 10 facing the guide pipe 16.

When the inner cable 14 is pushed further in the backward direction, the cable end 14a is guided from the guide member 10c to the ramped surface 10f of the turn-up portion 10d. When the cable end 14a advances further on the ramped surface 10f while it bends the inner cable 14 upwardly along to the angle of the ramped surface 14f, thereby generating a downward return force in the inner cable 14, the tip of the cable end 14a eventually reaches a plate spring 17. The cable end 14a further advances while deforming the plate spring 17.

After the cable end 14a passes the projection 10e, the inner cable 14 immediately moves downward into the cable retaining groove 10b by the downward return force thereof as well as a return force of the plate spring 17. Consequently, the cable end 14a is captured by the backside edge of the cable retaining groove 10b. Because the cable end 14a goes down as noted above, the plate spring 17 returns to its original state by the return force produced by an elastic portion 17a. At this time, a hitting sound is generated because a clash portion 17b of the plate spring 17 hits the side surface of the brake lever 10. Thus, a worker can confirm by this sound that the cable connection has been completed.

After the connecting procedure noted above, the inner cable 14 may move backward along an inner surface of the shoe rim 2b of the brake shoe 2. Such a movement of the inner cable 14 is suppressed by the plate spring 17 in such a way that the lower (free) end of the elastic portion 17a of the plate spring 17 prevents the inner cable 14 from coming out from the cable retaining groove 10b. Thus, the connection of the inner cable 14 and the brake lever 10 is maintained. The gap between the lower end of the plate spring 17 and the tip of the projection 10e is made smaller than the diameter of the cable end 14a, thereby further prohibiting the cable end 14a from coming out from the cable retaining groove 10b.

In the case where the cable end 14a has to be taken out from the brake lever 10, such as when the brake shoes 1 and 2 are to be replaced, the plate spring 17 may be forcibly deformed backwardly to create an enough clearance to pass the cable end 14a.

According to the configuration of the brake device described in the foregoing, the inner cable and the cable end can be securely connected to the brake lever even in the case that the brake lever is located under the shoe web facing the back plate or the brake cable is required to be blind connection after the brake drum is installed, and thus invisible to a worker. Moreover, the completion of the brake cable connection can be confirmed by the hitting sound produced by the plate spring. Once connected to the brake lever, the inner cable or the cable end will not disconnected from the brake lever unless the plate spring is manually and forcibly deformed.

In the conventional brake device described above, since the brake lever 10 withstands a large force, the brake lever generally has to be made of thick steel. In the foregoing example, since it is integrally made with the brake lever 10, the guide member 10c also has the same thickness of the brake lever 10. However, once used for installing the brake cable, the guide member 10c plays no other role thereafter. Further, it is sufficient that the guide member 10c can guide the cable end 14a toward the predetermined location. Thus, the guide member 10c needs not to have so much mechanical strength.

Since the guide member 10c is made of the steel with the same thickness of the brake lever 10, it also has significant weight. In the automobile industry, there is a strong demand for weight reduction in any components used in automobiles. Further, because of the integration of the guide member 10c, the shape of the brake lever 10 has to be complicated, thereby limiting design flexibility, increasing material cost and processing cost, resulting in increase of an overall manufacturing cost.

As to the guide pipe 16 functioning as the cable deflecting means, the inner cable 14 which slides along the inner wall of the guide pipe 16 receives a high tension when the brake is activated. Because the guide pipe 16 is curved rather than straight, the part of the tension (tensile force) is applied to the curved portion of the guide pipe 16. Thus, the guide pipe 16 must have sufficient thickness to ensure sufficient mechanical strength and be firmly fixed to the back plate 5 by means of, for example, welding. Further, the guide pipe 16 must have sufficient length to accurately guide the cable end 14a to the guide member 10c. Because of the foregoing reasons, the guide pipe 16 in the prior art is heavy and costly.

SUMMARY OF THE INVENTION

It is, therefore, an object of the present invention to provide a brake cable connecting device for accurately securely easily connecting a brake cable to a brake lever within a brake device in a blind manner by using a guide unit of light weight and low cost.

It is another object of the present invention to provide a brake cable connecting device which achieves reduced weight and cost while attaining improved mechanical strength and durability.

In the present invention, the brake cable connecting device for a drum brake for connecting a brake cable to a free end of a brake lever comprises a brake lever within the drum brake which urges brake shoes radially open and has a channel bent substantially into U-shape in cross section at the free end portion thereof, a guide means which permits the brake cable passing through the channel with a cable end of the brake cable engaging behind the channel to detachably connect the brake cable to the brake lever, a cable deflection means which adapts the brake cable to be into the drum brake through an opening of a back plate and bent the brake cable along thereof to lead the cable end toward the channel, wherein the guide means comprises of a guide unit which is a component made separately from the brake lever and mounted into the channel of the brake lever.

The guide unit includes a cable retaining groove bent into U-shape in cross section fitting in the U-shaped channel of the brake lever for fixedly attaching the brake cable to the free end of the brake lever, a guide member leading the cable end from the cable deflection means to the front face of the cable retaining groove, and a ramped surface angled outwardly at the free marginal upper end portion of the cable retaining groove for deflecting the brake cable when the cable end moves along the surface thereof for generating a return force in the brake cable. In the foregoing arrangement of the guide unit, the brake cable snaps in the cable retaining groove by the return force when the cable end passes a peak of the ramped surface.

The guide unit is made of a thin plate spring and is mounted on the free end of the brake lever. The brake lever has an engagement projection and the guide unit has an engagement hole. Thus, the guide unit is fixed to the brake lever by fitting the engagement projection in the engagement hole and superposing the cable retaining groove in the U-shaped channel of the brake lever.

The guide unit of the present invention includes a projection on an inner wall of the cable retaining groove for preventing the brake cable coming out from the groove. The projection is inclined in a manner that height of the projection increases in a downward direction in the cable retaining groove. A distance between a tip of the projection and an opposing inner wall of the cable retaining groove is smaller than a diameter of the brake cable, thereby preventing the brake cable from coming out.

In another aspect of the present invention, the cable retaining groove is provided with an upward projection on a bottom surface thereof for attaining a predetermined clearance between the brake cable and the bottom surface thereof. In a further aspect of the present invention, front and rear edges of the cable retaining groove are bent outwardly at about a right angle relative to a direction of the brake cable to form flat surfaces. This structure is effective in minimizing friction between the brake cable and the front and rear edges of the cable retaining groove.

In a further aspect of the present invention, the cable deflection means is configured by an upper plate member which is curved to form a tubular shape and a lower plate member extended from an anchor portion of the back plate which supports the brake shoe. In this arrangement, the brake cable is supported between the upper plate member and the lower plate member in parallel to a horizontal axis of the drum brake. The upper plate member is provided on a retaining plate which prevents brake shoes from lifting from the back plate. A gap between a curved side of the upper plate member and the back plate is made smaller than a diameter of the brake cable or a diameter of a coil spring surrounding the inner cable of the brake cable.

DETAILED DESCRIPTION OF THE PREFERRED EMBODIMENTS

The embodiments of the present invention are now explained with reference to the accompanying drawings.

Figure 1:
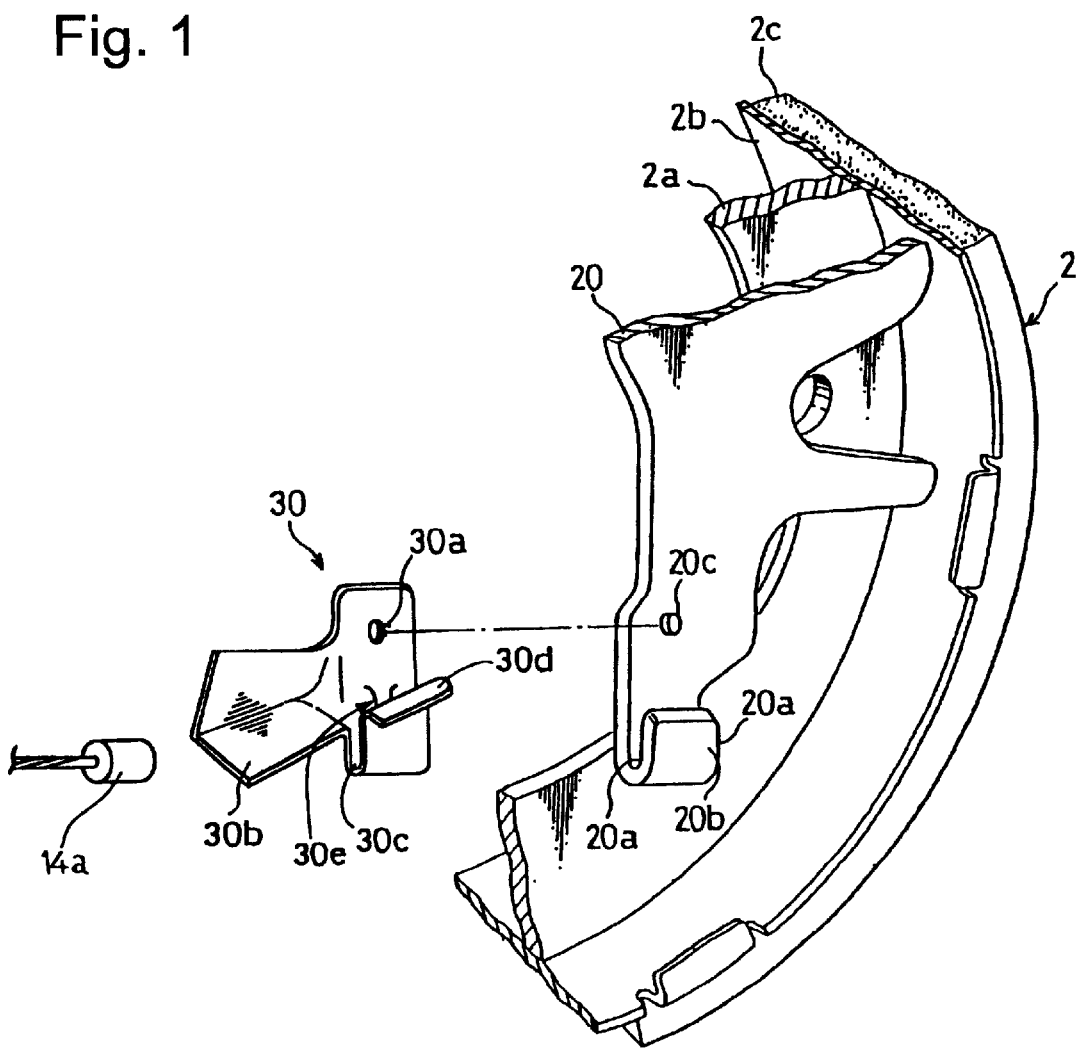
FIG. 1 is an exploded perspective view of the brake cable connecting portion viewed from the back plate side of the brake device in the first embodiment of the present invention.
Figure 9:
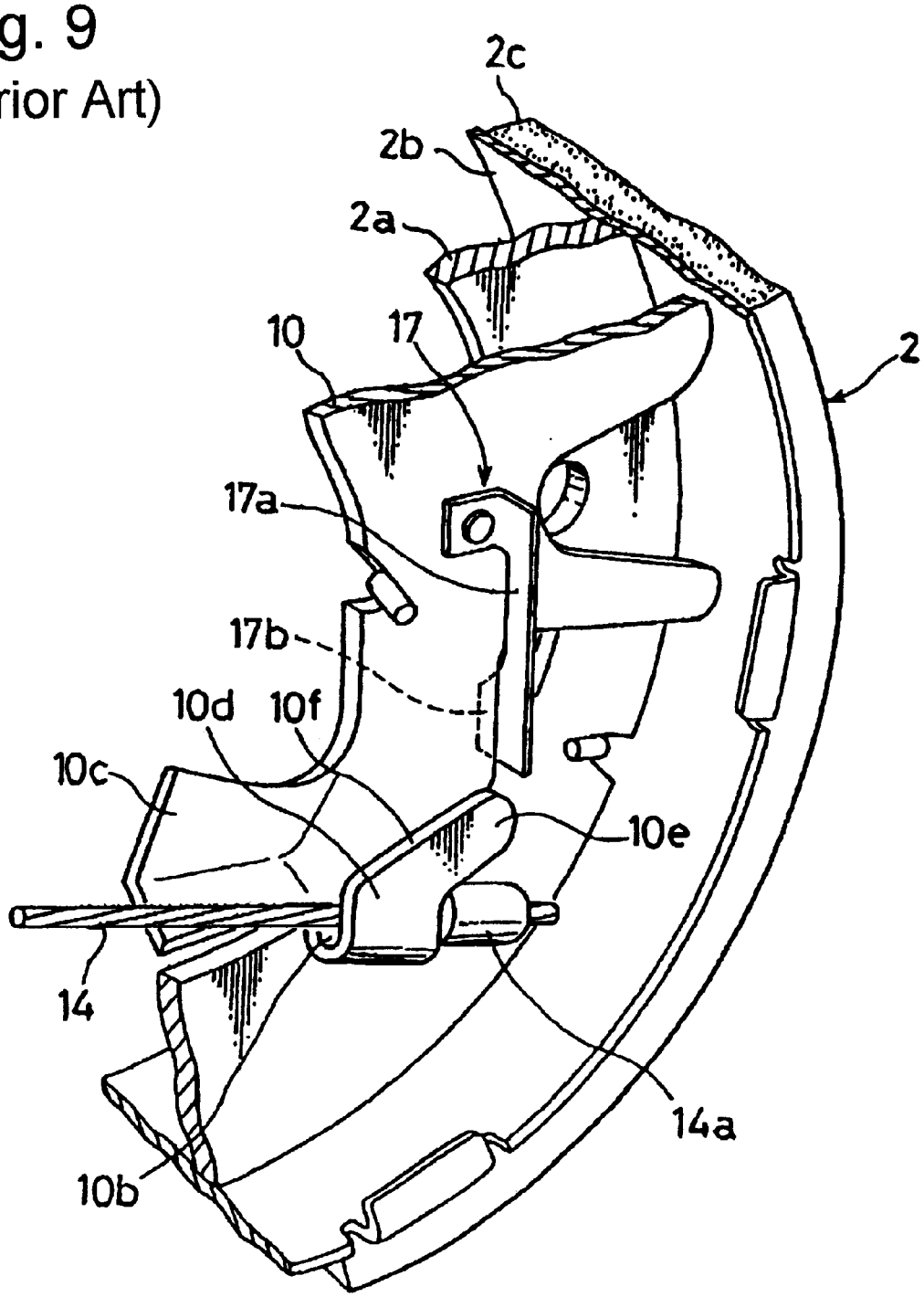
FIG. 9 is a perspective view showing the essential portion of the brake cable connecting portion of FIG. 8.

FIG. 1 shows the first embodiment of the present invention which is illustrated in a manner corresponding to the prior art of FIG. 9. In FIG. 1, the components identical to the components in FIG. 9 are denoted by the same reference numerals. In the following, explanation of the present invention will be made primarily on the configurations different from those in the prior art.

A brake lever 20 in the present invention differs from the brake lever 10 in the prior art in that it lacks the guide member 10c. Moreover, while the free end of the brake lever 20 has a U-shaped channel 20a that corresponds to the cable retaining groove 10b in the prior art, it lacks, on the turn-up portion 20b, components equivalent to the ramped surface 10f and the projection 10e. The brake lever 20 includes an engagement projection 20c at a position above the channel 20a.

Figure 3:
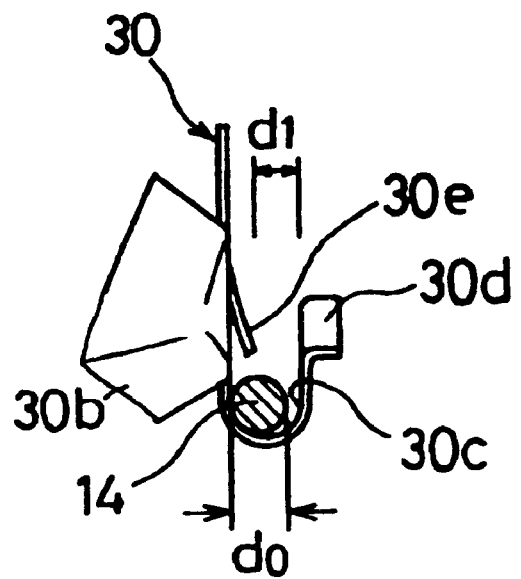
FIG. 3 is a diagram of the cable connecting device of the present invention viewed from the front side of the brake cable where the brake cable is connected to the brake lever.

A guide unit 30 being made separately from the brake lever 20 has an engagement hole 30a to receive therein the engagement projection 20c formed on the brake lever 20 and a guide member 30b which corresponds to the guide member 10c in the prior art, and a brake retaining groove 30c bent into U-shape in cross section. The guide unit 30 further includes a ramped surface 30d rising backwardly upwardly formed on the top of a turn-up portion of the cable retaining groove 30c, and a projection 30e partially cut out and formed on the surface opposed to the turn-up portion of the guide unit 30 for preventing the brake cable from coming out from the cable retaining groove 30c. As shown in FIG. 3, the projection 30e is formed in an inclined fashion so that the height of the projection increases downwardly inwardly in the cable retaining groove 30c.

In the brake cable connecting device of the present invention, although the brake lever 20 is made of a steel plate with thickness of approximately 4 mm in general, the guide unit 30 is made of a thin plate, preferably a spring plate with thickness of less than 1 mm. Thus, an overall weight of the guide unit 30 is substantially lighter than that of the guide member 10c and the projection 10e provided on the brake lever in the prior art.

The complex structure in the free end of the brake lever 10 in the prior art is no longer used in the brake lever 20 of the present invention. The brake cable connecting device is realized by utilizing the guide unit 30 which is formed separately from the brake lever 20. Since the guide unit 30 is made of a thin plate produced by pressing for example, it is easy to manufacture and is cost-effective. Even when the dimension such as the width of the guide member 30b has to be increased, a resultant increase in the overall weight of the brake device is negligible.

The guide unit 30 configured as described in the foregoing is mounted on the brake lever 20 by coupling the engagement hole 30a on the guide unit 30 to the engagement projection 20c on the brake lever 20 and by placing the lower portion of the cable retaining groove 30c in the channel 20a. In this situation, as the lower position of the guide unit 30 is specified by superposing the outer face of the groove 30c into the channel 20a, and the upper position of the guide unit 30 is specified by the engagement between the projection 20c and the hole 30a, the guide unit 30 can be securely and easily fixed to the brake lever 20 without play.

FIG. 3 shows the situation where the inner cable 14 is installed to the cable retaining groove 30c. The projection 30e formed by partially cutting the wall of the guide unit 30 for cable coming out prevention is provided on an inside wall of the cable retaining groove 30c. The projection 30e is formed in an inclined manner so that the width of the cable retaining groove 30c is decreased downwardly to the bottom. Since the guide unit 30 is made of a thin spring plate, the projection 30e also has the elasticity.

The procedure of connecting the inner cable 14, constituting the brake cable, to the brake device is made in a manner similar to that of the prior art. When the inner cable 14 is inserted from outside of the back plate 5 through a cable deflection means (not shown), the cable end 14a eventually reaches and contacts anywhere on the widened fan-shape surface of the guide member 30b of the guide unit 30.

Figure 2:
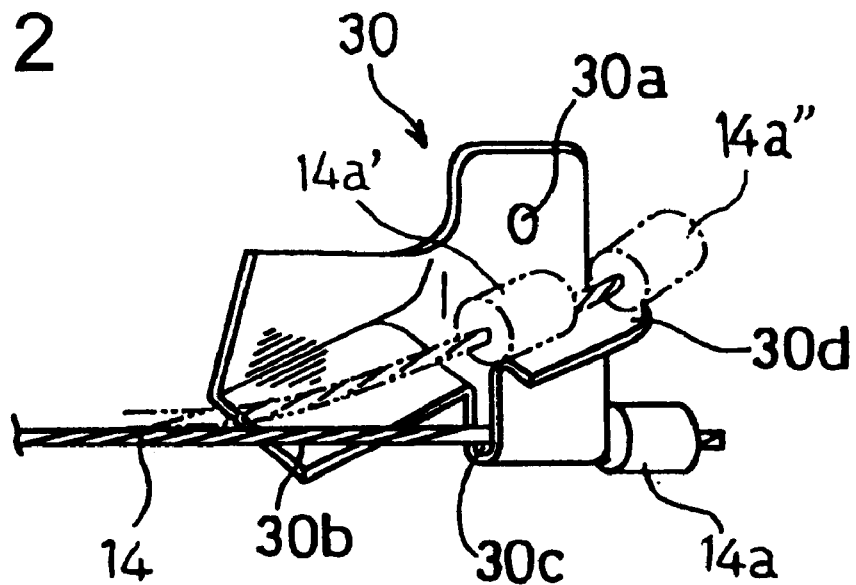
FIG. 2 is a diagram showing the brake cable connecting process of the present invention wherein the cable end is automatically engaged with the cable retaining groove.

By further inserting the inner cable 14, the cable end 14a advances along the guide member 30b and reaches the ramped surface 30d. By further advancing on the ramped surface 30d while it bends the inner cable 14 forcibly upwardly along the angle of the ramped surface, a downward return force is generated in the inner cable 14. As shown in FIG. 2, as the inner cable 14 further proceeds and the cable end 14a moves from 14a' to 14a" on the slope of the ramped surface 30d, the cable end 14a passes through the top end of the ramped surface 30d. Then caused by the return force, the cable end 14a immediately snaps in the engagement position of backside edge of the cable retaining groove 30c while the inner cable 14 deflects the tip of the projection 30e slightly. Consequently, the inner cable 14 automatically installs into the cable retaining groove 30c. The length of the cable retaining groove 30c is the same as or slightly shorter than that of the channel 20a on the brake lever 20. Hence, the cable end 14a is also engaged to the backside edge of the channel 20a on the brake lever 20.

As described above, though the tip of the projection 30e is slightly displaced when the inner cable 14 passes it, the width $d_1$ between the tip of the projection 30e and the opposite wall of the cable retaining groove 30c of the turn-up portion is designed to be smaller than the diameter $d_0$ of the inner cable 14. The purpose of this dimension and structure of the projection 30e is to prevent the inner cable 14 from coming out from the cable retaining groove 30c such as when the inner cable 14 involves slack during the connecting process or when the inner cable 14 returns earlier than the brake lever 20 upon releasing the parking brake. Thus, other designs are also possible to achieve the same purpose such as forming the ramped surface 30d to have a projection similar to the projection 10e in the prior art which is elongated toward the backside of the cable retaining groove 30c.

In the present invention, as noted above, the coming-out of the inner cable 14 is prevented by the projection 30e which is inclined so as to decrease the width of the cable retaining groove 30c as going downward. Thus, the attempt of the inner cable 14 to go outside of the cable retaining groove 30c makes the angle of the projection 30e even larger, which further reduces the width $d_1$, thereby further prohibiting the inner cable 14 from coming out. Thus, the embodiment of the present invention can securely install the brake cable to the brake device regardless of the slack or earlier return action of the inner cable 14. Moreover, the projection 10e in the prior art is unnecessary in the present invention, resulting in further reduction of the weight.

Figure 4A:
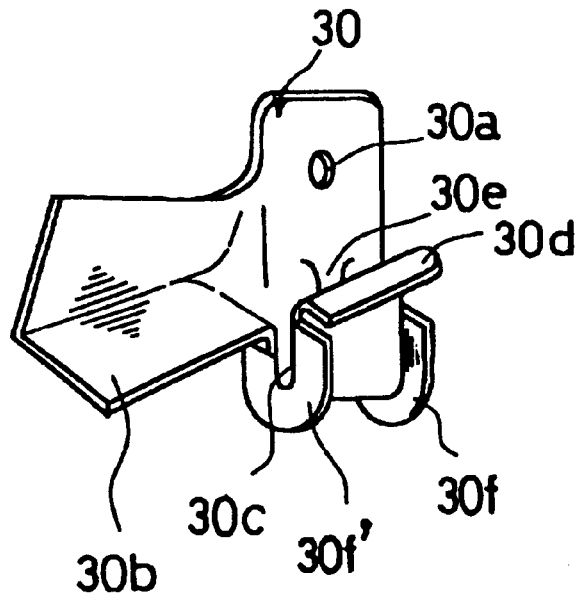
FIG. 4(*a*) is a perspective view of the brake cable connecting device in the second embodiment of the present invention, and FIG. 4(*b*) is a diagram of the brake cable connecting device of FIG. 4(*a*) viewed from the rear side of the brake cable.
Figure 4B:
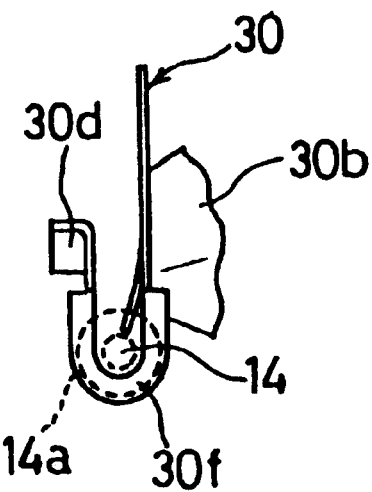

FIG. 4 shows the second embodiment of the present invention and depicts only the modified structure of the guide unit 30. The second embodiment is characterized in having flat surfaces 30f and 30f' bent at about a right angle outwardly at the respective ends of the cable retaining groove 30c.

Though in the brake operation, it is not capable for the free end of the brake lever 20 moving straight horizontal to the axis direction of the brake device, in the case without the flat surface 30f' at left side in FIG. 4, the inner cable 14 would directly contact the left edge of the cable retaining groove 30c of the guide unit 30 in FIG. 1 (or the cable retaining groove 10b in the prior art in FIG. 9). Both of the guide unit 30 and the brake lever 20 are formed by pressing which may leave sharp edges. Hence, when the inner cable 14 happens to contact the sharp edges of the cable retaining groove 30c, the inner cable 14 may be subject to wear by friction.

In contrast, the inner cable 14 in the example of FIG. 4 contacts the round surface formed by the bent portion between the flat surface 30f' and the cable retaining groove 30c. Because the round surface of the bent portion is smooth, the inner cable 14 will not be damaged by the friction. Moreover, the cable end 14a is suspended by the flat surface 30f at right side (the backside of the groove) Thus, the contact area between the flat surface 30f and the engaging surface of the cable end 14a is sufficient for operation and this is not required the larger diameter of the cable end 14a, thereby being able to standardize the size of the cable end.

For example, when the guide unit 30 is made of thin spring plate, the portion of the cable retaining groove 30c where contacts the cable end 14a may not be permanent set in fatigue and is capable to be tiled with respect to the cable end 14a of the inner cable 14 during operation, thereby eliminating the local deformation and improving the durability of the inner cable 14.

Figure 5A:
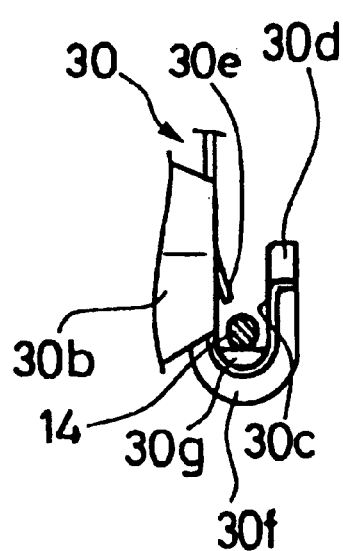
FIG. 5(*a*) shows the brake cable connecting device in the third embodiment of the present invention viewed from the front side of the brake cable, and FIG. 5(*b*) shows the brake cable connecting device of FIG. 5(*a*) viewed from rear side of the brake cable.
Figure 5B:
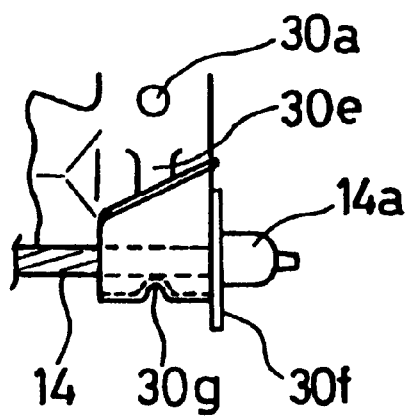

FIG. 5 shows the third embodiment of the present invention showing the guide unit 30 suited for establishing a clearance between the inner cable 14 and the bottom edges of the cable retaining groove 30c. This embodiment is characterized in that a projection 30g upwardly oriented is provided at the bottom surface of the cable retaining groove 30c. The projection 30g is formed integrally by, for example, punching the bottom of the cable retaining groove 30c from the outside when producing the guide unit 30.

In this embodiment, the projection 30g creates the situation where the inner cable 14 is positioned higher than the bottom surface of the cable retaining groove 30c because of the height of the projection 30g. In the operation of the brake device, especially when the inner cable 14 moves long stroke (backward and forward), the inner cable 14 easily contacts the edge of the cable retaining groove 30c at left side. As a result, the inner cable 14 may be worn out and damaged by the friction. Accordingly, the projection 30g of the present invention protects the inner cable 14 from the interference by creating a clearance between the edge of the cable retaining groove 30c and the inner cable 14.

Moreover, because the projection 30g prevents the inner cable 14 from contacting the edge of the cable retaining groove 30, the flat surface 30f' at the front side of the cable retaining groove 30c shown in FIG. 4 is no longer necessary, which simplifies the structure of the guide unit 30.

Figure 6:
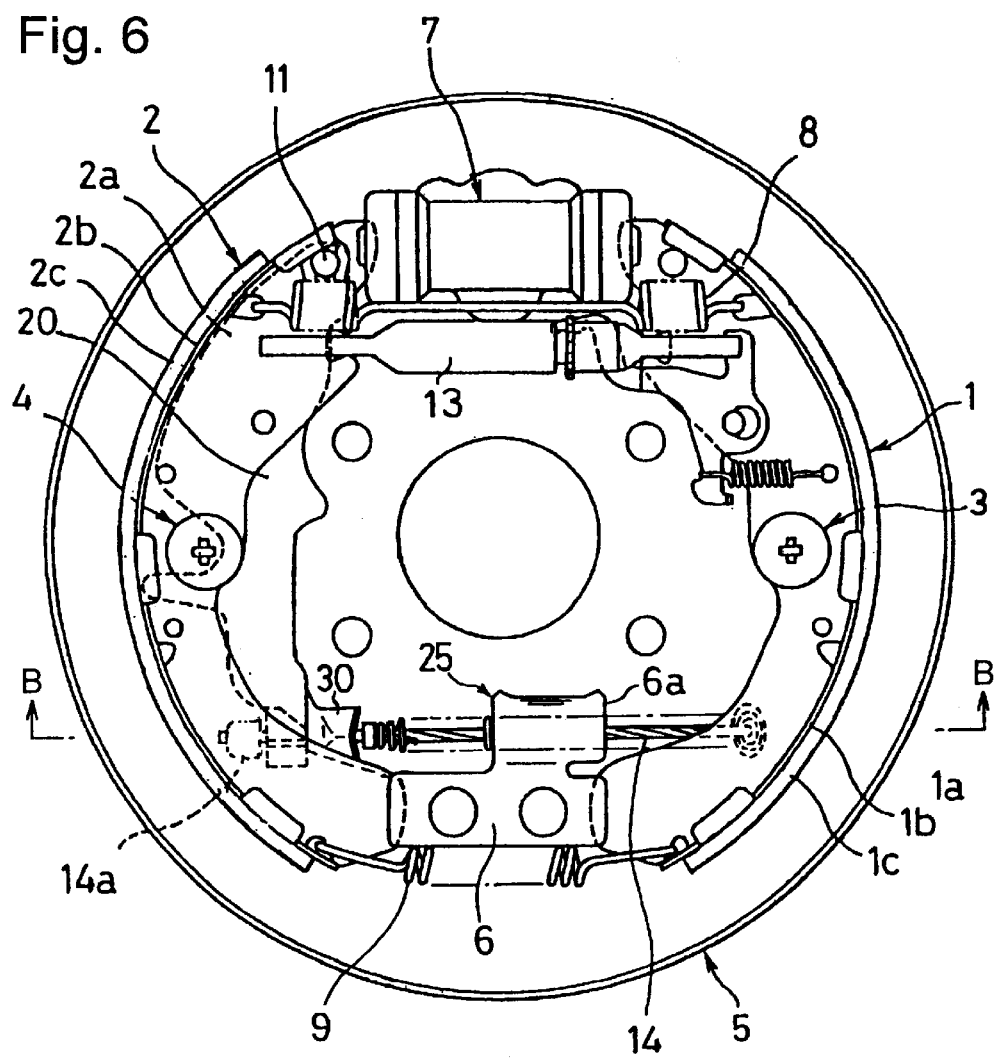
FIG. 6 is a plan view of the LT (leading-trailing) type drum brake in the fourth embodiment of the present invention.
Figure 7:
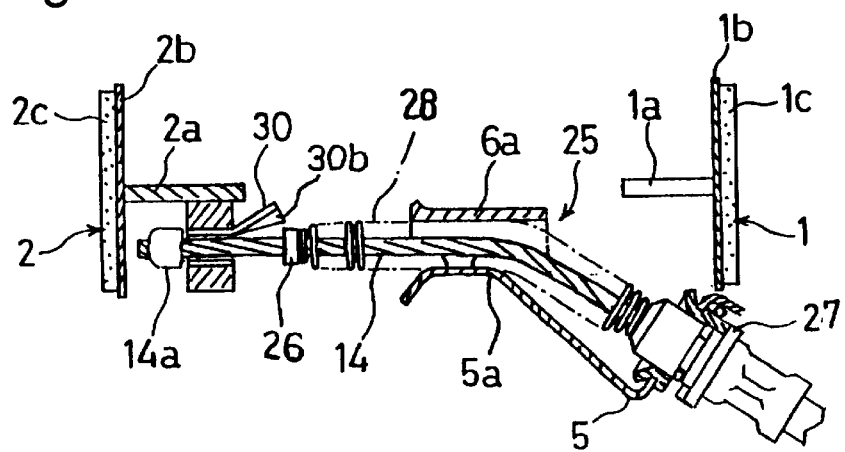
FIG. 7 is a cross sectional view of the drum brake device in the fourth embodiment of the present invention taken along a B—B line of FIG. 6.
Figure 8:
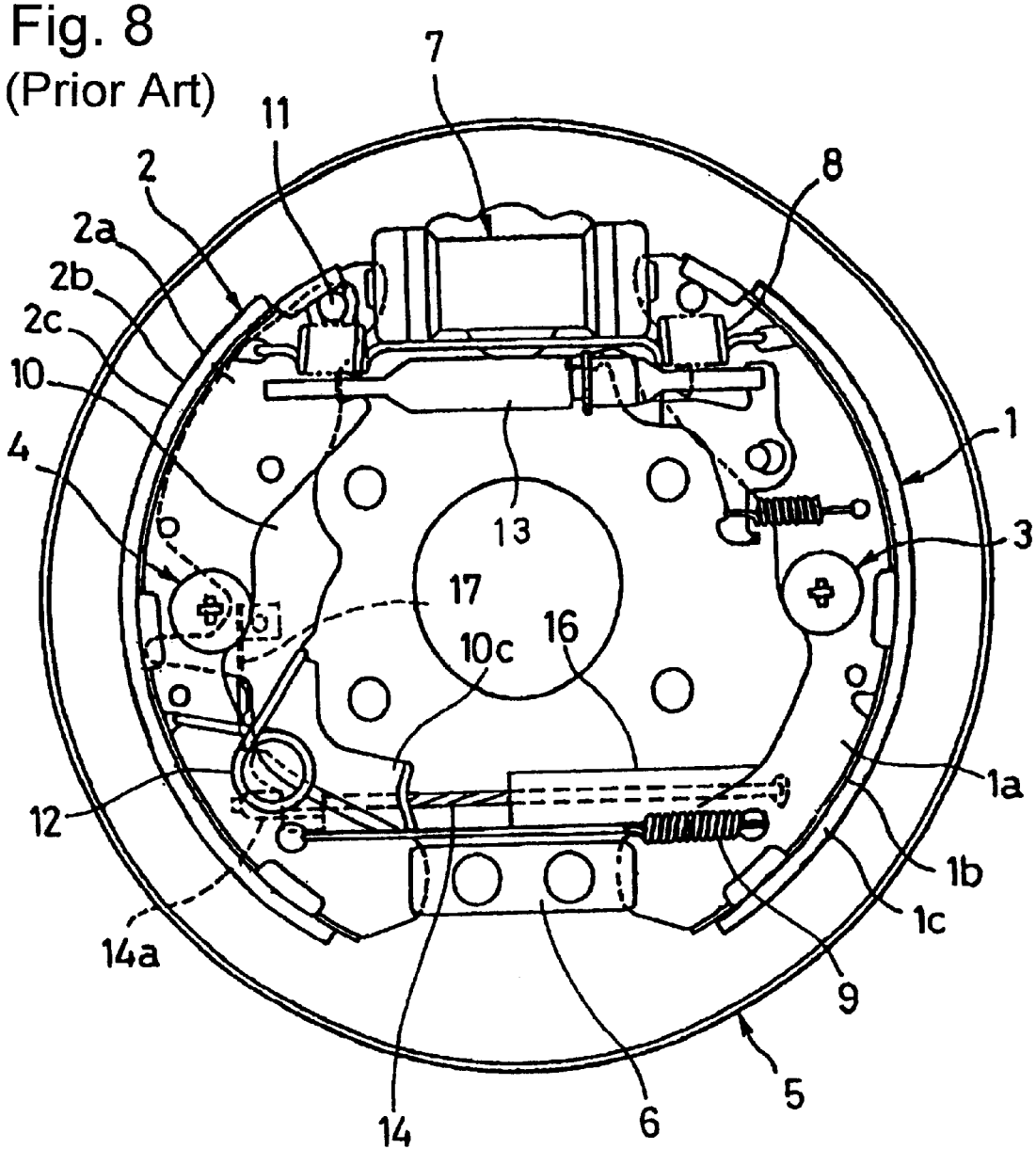
FIG. 8 is a plan view of the conventional LT type drum brake.

FIGS. 6 and 7 show the fourth embodiment of the present invention which is directed to the cable deflection means. FIG. 6 is a plan view of a LT (leading-trailing) type drum brake device and FIG. 7 is a cross sectional view taken along a B—B line of FIG. 6. In FIGS. 6 and 7, components identical to those in the prior art of FIG. 8 are denoted by the same reference numerals. In the following, the description of the invention will be made primarily on the configurations different from those in the prior art.

In the prior art shown in FIG. 8, a curved guide pipe 16 is used as the cable deflection means to direct the cable end 14a fixed at the tip of the inner cable 14 to the cable retaining groove 10b. The inner cable 14 is inserted to and guided though the curved guide pipe 16 to be bent in a predetermined direction. In the parking brake operation, since the inner cable 14 produces a component of force toward the direction to the back plate 5 to urge itself to be straight and the produced force component directly acts the inner surface of the curved guide pipe 16.

Therefore, to maintain the sufficient mechanical strength, the guide pipe 16 must have sufficient thickness and be fixed to the back plate 5 firmly through, for example, fillet welding. The longer the guide pipe 16 and thus the closer to the cable retaining groove 10b, the more accurate it becomes to control the cable end 14a to reach the guide member 10c. Hence, the guide pipe 16 functioning the cable deflection means has relatively heavy weight. Further, because the guide pipe 16 is extended to be close enough to the brake lever 10, it substantially limits the available stroke of the brake lever 10.

In the embodiment of the present invention shown in FIGS. 6 and 7, a curved plate member 6a is extended toward the direction to the brake center from the retaining plate 6 which prevents the brake shoes 1 and 2 lifting from the back plate 5. A cable deflection means 25 is formed by a combination of the curved plate member 6a (upper plate member) and the back plate 5 (lower plate member). Namely, the plate member 6a is rounded in a semi-circular or a ¾ circular shape to form a tube like shape to cover the inner cable 14 at the top, and a curved protrusion 5a formed on the back plate 5 near the anchor thereof covers the inner cable 14 at the bottom in FIG. 7.

In the prior art shown in FIG. 8, the lever return spring 12 is provided between the brake shoe 2 and the brake lever 10 as a means to urge the inner cable 14 backward when the brake is released. In the present embodiment, a coil spring 28, which is a compression spring, surrounds the inner cable 14 between a stopper 26 fixed at the tip portion of the inner cable 14 and a cap 27 provided on the outer casing of the brake cable. Hence, the inner cable 14 in this embodiment is inserted into the deflection means 25 along with the coil spring 28.

The cable end 14a of the inner cable 14 inserted from the outside of the brake device into the back plate 5 changes its direction upon contacting the plate member 6a so as to be directed to the guide member 30b of the guide unit 30. In this situation, the force exerted by the inner cable 14a and applied to the plate member 6a is very small, thus, the plate member 6a can be made of a thin plate. In the configuration described above, the thick and elongated guide pipe 16 used in the prior art is unnecessary, resulting in substantial reduction of the weight in the cable deflection means 25. Since the guide pipe 16 is no longer used, it is also able to avoid heat problems involved in the fillet welding of the back plate.

It is preferable to minimize a gap between the curved inner side of the plate member 6a and the back plate 5. Such a small gap will effectively limit slack of the inner cable 14 until completing the connecting work of the one side of the brake cable to the brake application device (a hand lever) so that it can effectively prevent the inner cable 14 from coming out of the cable deflection means 25.

In the prior art, the guide pipe 16 used as the deflection means needs to be long enough so that the cable end 14a is directed to the guide member 10c accurately. Hence, the maximum stroke of the brake lever 10 is limited by the guide pipe 16. In the present invention, the width of the guide member 30b of the guide unit 30 can be increased for further secure guiding of the cable end 14a because the guide unit 30 is made separately from the brake lever 20. Therefore, a shorter length of the cable deflection means 25 (formed by the plate member 6a of the retaining plate 6) toward the brake lever is sufficient to guide the inner cable 14 to the guide member 30b since the width of the guide member 30b is large enough. As a result, a sufficient space between the free end of the brake lever with the guide member 30b and the plate member 6a can be achieved to allow a sufficient stoke of the brake lever 20.

When activating the parking brake, a strong tension is exerted to the inner cable 14 so that the inner cable 14 in the cable deflection means 25 is forced to be straightened. Since the curved protrusion 5a near the anchor of the back plate 5 guides the inner cable 14, it receives the tension of the inner cable 14. Thus, the back plate 5 and the curved protrusion 5a must have enough strength to withstand the tension. Such requirements can be easily achieved since the back plate 5 is made of a thick and hard metal plate, thereby achieving the cable deflection means 25 having sufficient mechanical strength.

In the prior art, the inner cable 14 slidably moves through the guide pipe 16, which inversely affects the durability of the inner cable 14. In the present invention, however, the inner cable 14 moves along while compressing the coil spring 28. Thus, the friction between the inner cable 14 and the coil spring 28 is small because the relative movement between the two is small, thereby improving the durability of the inner cable 14.

In the embodiment shown in FIGS. 6 and 7, either types of the guide unit 30 shown in FIGS. 1–5 can be used. Alternatively, the cable deflection means using the guide pipe 16 in the prior art can be used in combination with the guide unit 30 of the present invention shown in FIGS. 1–5. In the embodiments described above, the drum brake device has both a service brake operated hydraulically by the wheel cylinder 7 and a parking brake operated mechanically by the brake lever 20. However, the present invention can also be used for a service brake operated mechanically by the brake lever 20. The outer casing of the brake cable described in the embodiments of the present invention is not an essential component.

As described in the foregoing, in the brake cable connecting device for the drum brake, the guide means is comprised of the guide unit which has the cable retaining groove bent into U-shape in cross section to connect the cable end, the guide member to guide the cable end toward the backward (opposite to the cable pulling) direction facing the cable retaining groove, the ramped surface guiding the cable end from the guide member to the rear engagement surface of the brake lever and deflecting the cable end along the surface thereon when moving backward.

The guide unit is made separately from the brake lever, and is mounted on the brake lever. Hence, by reducing the weight of the guide unit, the overall weight of the brake device is also reduced. Moreover, the shape of the brake lever becomes simple, allowing more freedom in its design and achieving reduction of material cost and production cost. The guide unit is made of a thin plate spring, thus, production of the guide unit is simple and easy since it can be made by pressing.

Because the cable retaining groove of the guide unit superposes in the U-shaped channel of the brake lever, and the engagement projection of the brake lever couples with the engagement hole provided on the guide unit, the guide unit can be securely and easily fixed to the brake lever without play by a simple operation.

In the other embodiment, the projection is formed on the inner surface of the cable retaining groove 30c of the guide unit 30 in the inclined fashion so that the distance between the projection and the opposed surface of the cable retaining groove is decreased toward the lower position of the cable retaining groove. By forming the distance smaller than the diameter of the inner cable, the brake cable will not be coming out from the cable retaining groove even when the brake cable is slacked/loosened.

In the embodiment wherein the upward projection is provided at the bottom of the cable retaining groove of the guide unit to position the brake cable slightly higher above the bottom surface of the cable retaining groove, the brake cable wear caused by the friction between the inner cable and the edge of the cable retaining groove is effectively eliminated.

In the embodiment wherein the flat surfaces are extendedly bent on both sides of the cable retaining groove of the guide unit and are designed to contact with the both edge surfaces of the brake lever channel respectively, the brake cable or cable end can be prevented from the wear by the friction with the edges of the cable retaining groove. In this case, if the guide unit is made of a thin spring plate, permanent set in fatigue at the area contacting the cable end can be prevented by the mechanical enforcement established by the flat surface. Further, it may be capable to be tilted with respect to the cable end of the inner cable during operation, thereby eliminating the local deformation and improving the durability of the brake cable.

In the embodiment where the cable deflection means is formed by the curved plate member and the curved back plate portion formed on the anchor of the back plate, and the brake cable and the coil spring surrounding the inner cable are inserted in the cable deflection means running in the direction parallel to the brake axis, the weight of the deflection means can be substantially reduced. When the brake is activated, the brake cable straightens and applies a high tension to the cable deflection means. Since the back plate is made of a thick and hard material, it can receive the high tension without causing any damage.

In this embodiment, since the curved plate member is extended on the retaining plate which prohibits lifting the brake shoes from the back plate, the configuration of the cable deflection means can be further simplified.

Since the gap between the side of the curved plate member and the back plate is formed substantially smaller than the diameter of the brake cable or the coil spring, the brake cable is prevented from going outside of the cable deflection means.

Although only a preferred embodiment is specifically illustrated and described herein, it will be appreciated that many modifications and variations of the present invention are possible in light of the above teachings and within the purview of the appended claims without departing the spirit and intended scope of the invention.

What is claimed is:

1. A brake cable connecting device in a drum brake for fastening a brake cable to a brake lever comprises:
    a brake lever within the drum brake urges brake shoes radially open and has a channel bent substantially into U-shape in cross section at the free end portion thereof;
    a guide means permits said brake cable passing through said channel with a cable end of said brake cable engaging behind said channel to detachably connect said brake cable to said brake lever;
    a cable deflection means adapts said brake cable to be into the drum brake through an opening of a back plate and bends said brake cable along thereof to lead said cable end toward said channel; and
    said guide means comprises of a guide unit being a component made separately from the brake lever and mounted into said channel of the brake lever, the guide unit is comprised of:
        a cable retaining groove bent into U-shape in cross section fitting in said U-shaped channel of the brake lever for fixedly attaching the brake cable to the free end of the brake lever;
        a guide member leading said cable end from the cable deflection means to the front face of said cable retaining groove; and
        a ramped surface angled outwardly at the free marginal upper end portion of said cable retaining groove for deflecting the brake cable when said cable end moves along the surface thereof for generating a return force in the brake cable;
    wherein the brake cable snaps in the cable retaining groove by the return force when said cable end passes a peak of said ramped surface.

2. A brake cable connecting device for a drum brake as defined in claim 1, wherein the guide unit is made of a thin spring plate.

3. A brake cable connecting device for a drum brake as defined in claim 1, wherein the brake lever has an engagement projection and the guide unit has an engagement hole, and wherein the guide unit is fixed to the brake lever by fitting the engagement projection in the engagement hole and superimposing the cable retaining groove in the U-shaped channel of the brake lever.

4. A brake cable connecting device for a drum brake as defined in claim 1, wherein the guide unit includes a projection on one of inner walls of the cable retaining groove, the projection being inclined in a manner that height of the projection increases in a downward direction in the cable retaining groove, and wherein a distance between a peak of the projection and an opposing inner wall of the cable retaining groove is smaller than a diameter of the brake cable.

5. A brake cable connecting device for a drum brake as defined in claim 1, wherein the cable retaining groove is provided with an upward projection on a bottom surface thereof for attaining a predetermined clearance between the brake cable and the bottom surface thereof.

6. A brake cable connecting device for a drum brake as defined in claim 1, wherein front and rear edges of the cable retaining groove are bent outwardly at about a right angle relative to a pulling direction of the brake cable to form flat surfaces which contact both edge surfaces of the brake lever respectively.

7. A brake cable connecting device for a drum brake as defined in claim 1, wherein the cable deflection means is configured by an upper plate member which is curved to form a tubular shape and a lower plate member extended from an anchor portion of the back plate of the drum brake, and wherein the brake cable is supported between the upper plate member and the lower plate member in parallel to a horizontal axis of the drum brake.

8. A brake cable connecting device for a drum brake as defined in claim 7, wherein the upper plate member is extended from a retaining plate which prevents lifting brake shoes from the back plate.

9. A brake cable connecting device for a drum brake as defined in claim 7, wherein a gap between a curved side of the upper plate member and the back plate is made smaller than a diameter of the brake cable or a diameter of a coil spring surrounding the brake cable.

* * * * *